W. C. DWYER.
DISK HARROW.
APPLICATION FILED DEC. 21, 1918.
1,336,687.
Patented Apr. 13, 1920.
2 SHEETS—SHEET 1.
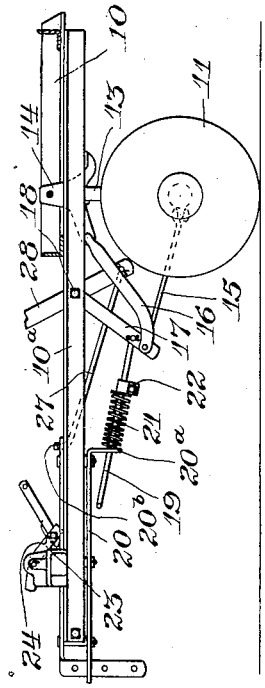
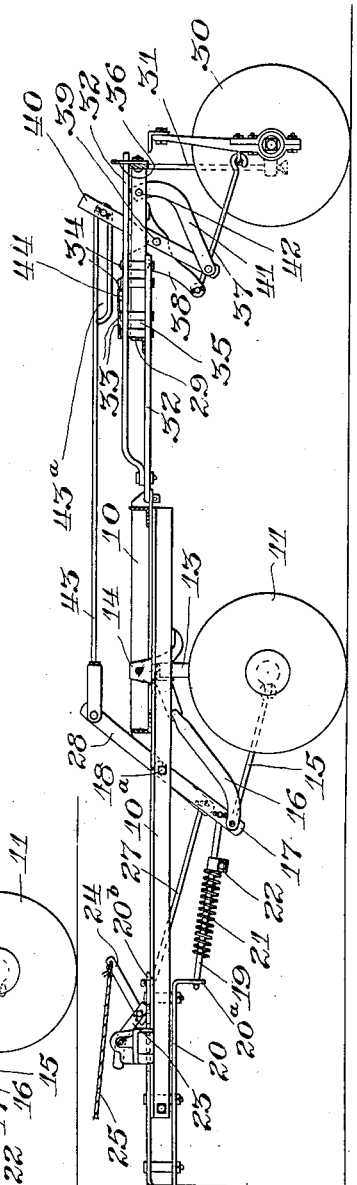
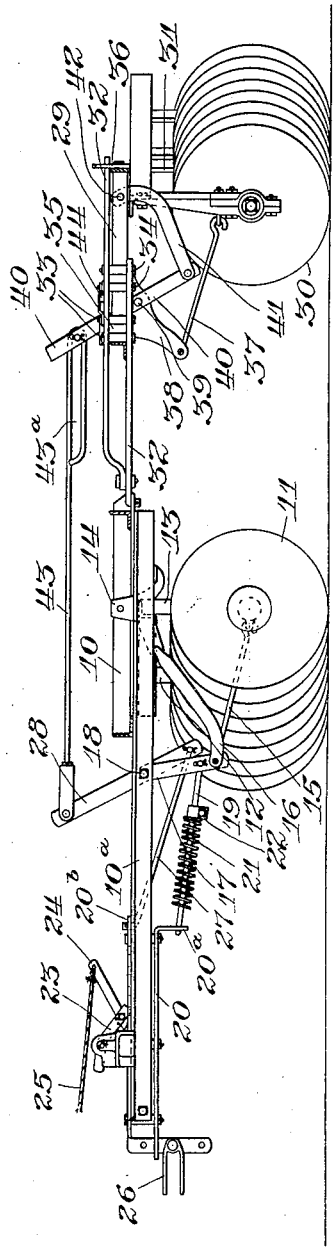
Inventor:
William C. Dwyer,
By Chas. E. Lord
Atty.

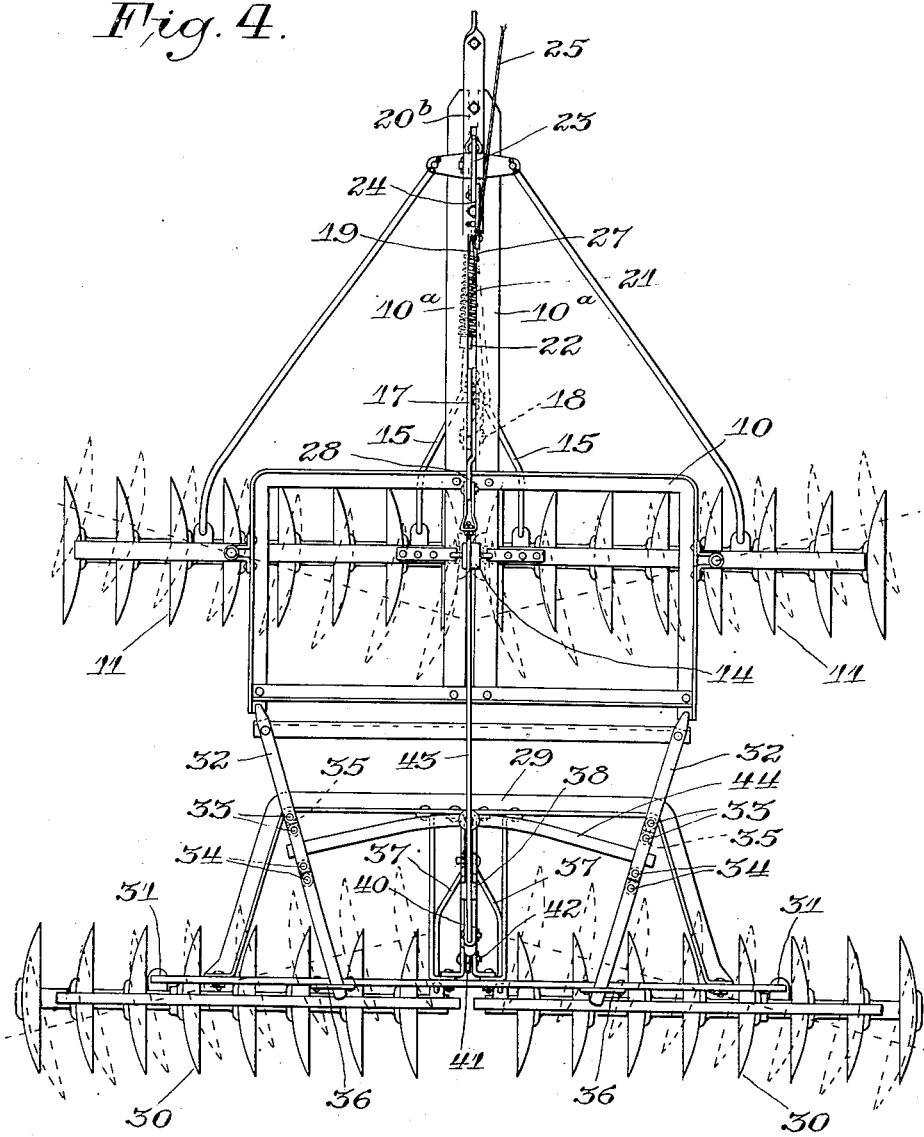

UNITED STATES PATENT OFFICE.

WILLIAM C. DWYER, OF AUBURN, NEW YORK, ASSIGNOR TO INTERNATIONAL HARVESTER COMPANY, A CORPORATION OF NEW JERSEY.

DISK HARROW.

1,336,687.   Specification of Letters Patent.   Patented Apr. 13, 1920.

Application filed December 21, 1918. Serial No. 267,850.

*To all whom it may concern:*

Be it known that I, WILLIAM C. DWYER, a citizen of the United States, residing at Auburn, in the county of Cayuga and State of New York, have invented certain new and useful Improvements in Disk Harrows, of which the following is a full, clear, and exact specification.

This invention relates to disk harrows.

An object of this invention is to provide a disk harrow in which the front harrow gangs will straighten as the harrow is backed, and with the same setting of the harrow angling mechanism, will tend to force the gangs into angle as the harrow is drawn forward.

Another object is to simplify the harrow construction as much as possible at the same time accomplishing the objects stated above.

These and other objects which will be apparent are attained by my invention which comprises a harrow having a frame in which disk gangs are pivotally mounted, sliding draft connections operable by a tractor for angling the gangs, and a compression spring between the sliding connections and the gangs.

Referring now to the drawings which show my invention,—

Figure 1 is a partial longitudinal vertical section just to the left of the center line showing the gangs straightened as in going ahead;

Fig. 2 is the same but with the gangs angled as when the harrow is going ahead;

Fig. 3 is the same but showing only the front section with the gangs straightened and the spring compressed as in backing; and Fig. 4 is a plan view of a double disk harrow showing front and rear sections operatively connected together.

The harrow which I have chosen to illustrate my invention consists of a double harrow having front and rear sections. The front section consists of a frame 10 on which are pivotally mounted two disk harrow gangs 11 upon the vertical pivots 12. The inner ends of these gangs are connected by means of vertical standards 13 to blocks 14 which slide between the angles $10^a$ which are spaced a short distance apart. The inner ends of the gangs and the block 14 are connected by rods 15 and 16 respectively, to a lever 17 which is hingedly mounted at 18 to the draft angles. The lever 17 is connected by means of a link 19 to the draft bars 20. This link is made slidable through the lower draft bar at $20^a$ and carries a spring 21 and an adjustable collar 22 whose purpose will later be explained.

The upper draft link $20^b$ has a series of openings with which the pawl 23 engages. This pawl is spring actuated and is manipulated by means of a trip lever 24 and a trip rope 25 which leads to the seat of a tractor to which the harrow is connected by means of a clevis 26. The draft bars are also connected by means of a link 27 to a lever 28 which is also carried by the pin 18.

The rear section comprises a frame 29 which has two disk gangs 30 pivotally mounted thereon at 31 with the greater number of disks lying inside these vertical bearings. This frame 29 is connected to the front frame by means of two sliding members 32 one of which is placed at each rear corner of the front frame. Each of these members is made up of an upper and a lower bar which are bolted together at 33 and 34. The block 35 which lies between the bars at 33 comes in contact with the forward part of the rear frame 29 and receives the draft. The upper bar 32 passes over the top of the rear frame and is guided at the rear by a strap 36.

The effect of this sliding bar 32 which is covered by co-pending applications, is to allow the front and rear harrows to approach each other as the harrow is backed, or upon a turn.

The inner ends of the rear harrow gangs are connected by means of links 37 to a block 38 which is made slidable upon horizontal guide bars which are part of the frame 29. This block is connected by means of a pin 39 to a lever 40 which in turn is pivotally connected to a link 41. This link is pivotally connected to a part of the frame at 42. The upper end of the link is connected by means of a link 43 with the lever 28 of the front section. The link 43 has a long slot $43^a$ which is made necessary by the amount of sliding adjustment made possible by the sliding members 32.

The links 32 carry an equalizing bar 44 which engages the lever 40 as the members 32 are forced back, thereby forcing the rear gangs to straighten.

It will therefore be seen that as the harrow is backed the draft links 20 will be forced back and the levers 28 and 40 drawn ahead, but that owing to the equalizing bar 44 the rear gangs will remain straight. At the same time the tendency in backing is for the front gangs to straighten, and this they will do, compressing the spring 21. As the harrow is now drawn forward the lever 40 will be drawn forward, angling the rear gangs and at the same time the spring 21 will act, causing the front gangs to begin to angle. Once the angling operation of the front gangs is started and they have begun to bite in the soil, the gangs will immediately take the full angle allowed by the setting of the parts.

While I have in the above specification shown and described but a single embodiment of my invention it is to be understood that it is capable of many modifications. Changes therefore in the construction and arrangement of parts may be made which do not depart from the spirit and scope of my invention as disclosed in the appended claims.

I claim—

1. In a harrow, a frame, disk gangs carried thereby, sliding draft connections including means operable by the draft power for angling the gangs, and a compression spring between the sliding connection and the gangs.

2. In a harrow, a frame, disk gangs carried thereby, draft connections slidable on the frame and connected to the gangs for angling the gangs by a rearward movement of the draft power, and a compression spring between the sliding connection and the gangs.

3. In a harrow, a frame, disk gangs carried thereby, draft connections slidable on said frame by the action of a tractor for changing the angle of the gangs, and a yielding means including a compression spring between the sliding draft connections and the gangs whereby the yielding means will yield to permit the gangs to straighten in backing but will act to cause the gangs to angle when the harrow is drawn forward.

4. In a harrow, front and rear sections, disk gangs thereon, draft connections slidable on the front section by the action of a tractor for changing the angle of the gangs, a yielding means including a compression spring between the sliding draft connections and the front gangs and a connection between said draft connection and the rear gangs for angling said rear gangs.

5. In a harrow, front and rear sections, disk gangs carried thereby, means for setting the angle of both gangs by a push of a tractor while the gangs are still substantially straight, and means including a compression spring for causing the gangs to assume the angle so set on a forward pull.

6. In a harrow, front and rear sections, disk gangs carried thereby, means for setting the angle of both gangs by a push of a tractor while the gangs are still substantially straight, means including a compression spring for causing the gangs to assume the angle so set on a forward pull, and means for releasing the angle on a forward pull.

7. In a harrow, front and rear sections, disk gangs carried thereby, means for setting the angle of both gangs by a push of a tractor while the gangs are still substantially straight, means including a compression spring for causing the gangs to assume the angle so set on a forward pull, and means operable from a tractor for releasing the angle on a forward pull.

8. In a harrow, a frame, disk gangs thereon, draft bars slidable on the frame, a draft rod telescopically attached thereto, means for connecting the rod to an end of each disk gang and yielding means permitting the gangs to straighten as the harrow is backed and forcing them to angle as the harrow is advanced.

9. In a harrow, a frame, disk gangs thereon, draft bars slidable on the frame, a draft rod telescopically attached thereto, means for connecting the rod to an end of each disk gang, and a compression spring permitting the gangs to straighten as the harrow is backed and forcing them to angle as the harrow is advanced.

10. In a harrow, a frame, disk gangs thereon, draft bars slidable on the frame, a draft rod telescopically attached thereto, means for connecting the rod to an end of each disk gang, and a spring permitting the gangs to straighten as the harrow is backed and forcing them to angle as the harrow is advanced.

In testimony whereof I affix my signature.

WILLIAM C. DWYER.